United States Patent
Park et al.

(10) Patent No.: US 6,935,225 B2
(45) Date of Patent: Aug. 30, 2005

(54) BREAD MAKER

(75) Inventors: Jae-ryong Park, Suwon (KR); Jong-wook Lee, Yongin (KR); Tae-uk Lee, Suwon (KR); Han-jun Sung, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 193 days.

(21) Appl. No.: 10/602,643

(22) Filed: Jun. 25, 2003

(65) Prior Publication Data

US 2004/0060454 A1 Apr. 1, 2004

(30) Foreign Application Priority Data

Jul. 19, 2002 (KR) ........................................ 2002-42589

(51) Int. Cl.[7] .............................. A23L 1/00; A47J 27/62; A47J 37/01; A21C 1/08
(52) U.S. Cl. .............................. 99/348; 99/353; 99/426
(58) Field of Search ........................... 99/325–331, 341, 99/342, 348, 343, 352–355, 426, 449; 366/69, 130, 143, 145, 146, 149, 219, 340, 341, 349, 602; 222/94, 98, 100–102; 206/219, 221; 383/38; 426/128, 232, 233, 392, 394, 87, 112, 113, 120, 124, 405, 512, 523

(56) References Cited

U.S. PATENT DOCUMENTS

| | | | | |
|---|---|---|---|---|
| 4,550,653 A | * | 11/1985 | Hedenberg | 99/348 |
| 4,550,654 A | * | 11/1985 | Hedenberg | 99/348 |
| 4,590,850 A | | 5/1986 | Hedenberg | |
| 4,803,086 A | * | 2/1989 | Hedenberg | 426/87 |
| 5,146,840 A | | 9/1992 | Hedenberg | |
| 5,947,009 A | | 9/1999 | Hedenberg | |
| 6,321,641 B1 | | 11/2001 | Wang | |

FOREIGN PATENT DOCUMENTS

| | | |
|---|---|---|
| JP | 6-327565 | 11/1994 |
| KR | 85-951 | 3/1985 |
| KR | 89-20484 | 11/1989 |
| KR | 1989-22341 | 12/1989 |
| KR | 1990-19891 | 12/1990 |
| KR | 91-17800 | 11/1991 |
| KR | 1992-8722 | 6/1992 |
| KR | 20-226691 | 3/2001 |
| KR | 2001-32188 | 4/2001 |
| KR | 2002-56628 | 7/2002 |
| WO | WO 86/03931 | 7/1986 |
| WO | WO 87/03784 | 7/1987 |
| WO | WO 92/10100 | 6/1992 |
| WO | WO 99/25467 | 5/1999 |

OTHER PUBLICATIONS

EPO Search Report for corresponding Application No. EP 02258730 dated Nov. 10, 2003.

* cited by examiner

Primary Examiner—Timothy F. Simone
(74) Attorney, Agent, or Firm—Staas & Halsey LLP

(57) ABSTRACT

A bread maker, including a main body having a baking space and kneading drums located at an upper part and a lower part in the baking space. The kneading drums hold opposite ends of a mixing bag. A movable tray member has a plurality of combining projections at opposite side walls thereof. A fixed tray member positioned opposite the movable tray member forms a slit through which the mixing bag passes. A tray holder is coupled to each end of the fixed tray member and the movable tray member. Each tray holder fixedly supports the fixed tray member, and has a plurality of guide grooves accommodating the combining projections to rotatably support the movable tray member. Anchoring prominences are on the guide grooves adjacent to the fixed tray member, preventing the combining projections from breaking away from the guide grooves when the movable tray member rotates.

22 Claims, 7 Drawing Sheets

BREAD MAKER

CROSS-REFERENCE TO RELATED APPLICATIONS

This application claims the benefit of Korean Application No. 2002-42589, filed Jul. 19, 2002, in the Korean Intellectual Property Office, the disclosure of which is incorporated herein by reference.

BACKGROUND OF THE INVENTION

1. Field of the Invention

The present invention relates to a bread maker, and more particularly, to a bread maker having a baking tray assembly with a fixed tray member and a movable tray member, in which noise generated due to a collision between the fixed tray member and the movable tray member as dough for the bread is kneaded is reduced.

2. Description of the Related Art

Generally, a bread maker has been used in the home for automatically kneading, fermenting, and baking bread.

For example, as shown in FIGS. 5 and 6, a bread maker disclosed in Korean Patent Application No. 2000-86024 includes a main body 101 having a baking space 110, a door 103 to open and close an opening formed at the front of the main body 101, and a panel 102 to manipulate the bread maker, which is provided at one side of the front of the main body 101.

At upper and lower parts of the baking space 110 are an upper kneading drum 111 and a lower kneading drum 112 for respectively winding an upper end and a lower end of a mixing bag (not shown) containing ingredients for dough. The upper kneading drum 111 and the lower kneading drum 112 are parallel to one another, and rotate reciprocally. Between the upper kneading drum 111 and the lower kneading drum 112 are a pair of a kneading supporting members 113 that prevent kneading ingredients in the mixing bag from being pushed out toward the upper kneading drum 111.

Also, between the kneading supporting member 113 and the lower kneading drum 112 is a baking tray 104 accommodating the kneaded ingredients, which may be withdrawn from the baking space 110 and removed from the bread maker.

The baking tray 104 is a rectangular container opening upwardly and is formed of a combination of a first tray member 140 and a second tray member 150. A slit 160 is formed between the first tray member 140 and the second tray member 150 where the first tray member 140 and the second tray member 150 join together.

As shown in FIG. 6, on each lower end of both side walls of the first tray member 140 is a protrusion rib 141 that is slidably coupled to a guide 114 (FIG. 5) in the baking space 110. Each protrusion rib 141 has a plurality of accommodating grooves 142 caved downwardly from the surface thereof.

On a lower end of both side walls of the second tray member 150 are a plurality of projections 151 that protrude from the surface thereof and are movably accommodated in the accommodating grooves 142 of the protrusion ribs 141.

The upper end of the mixing bag is wound on the upper kneading drum 111. The lower end of the mixing bag is wound on the lower drum 112 through the pair of kneading support members 113 and through the slit 160 formed on the bottom of the baking tray 104. Further, during kneading, the mixing bag containing the ingredients for the dough is reciprocated upwardly and downwardly by the upper kneading drum 111 and the lower kneading drum 112. Thus, the ingredients for the dough contained in the mixing bag are kneaded between the pair of kneading support members 113 and the baking tray 104.

After the kneading process is completed, the kneaded dough is placed in the baking tray 104 and the mixing bag is removed, and then the dough is made into bread using a heater 106.

In the conventional bread maker, when the mixing bag moves upwardly through the slit 160 of the baking tray 104 during the kneading process, the second tray member 150 rotates upwardly along with the mixing bag and is rotated at a predetermined angle relative to the protrusion ribs 141 because the projections 151 of the second tray member 150 are movably accommodated in the accommodating grooves 142 of the protrusion ribs 141.

Further, when the mixing bag moves downwardly, the second tray member 150, which has been rotated at the predetermined angle relative to the protrusion ribs 141, moves downwardly with the mixing bag to an initial position, to form the baking tray 104 having the slit 160 between the first tray member 140 and the second tray member 150.

However, as the second tray member 150 rotates downwardly to the initial position, a noise is generated when the second tray member 150 impacts the first tray member 140.

SUMMARY OF THE INVENTION

It is an object of the present invention to provide a bread maker for reducing a noise generated due to a collision between a fixed tray member and a movable tray member.

Additional objects and advantages of the invention will be set forth in part in the description that follows, and, in part, will be obvious from the description, or may be learned by practice of the invention.

To achieve the above and other objects according to an embodiment of the present invention, there is provided a bread maker, including a main body having a baking space; kneading drums located at an upper part and a lower part in the baking space, the kneading drums holding opposite ends of a mixing bag; a movable tray member having a plurality of combining projections at opposite side walls thereof; a fixed tray member positioned opposite the movable tray member to form a slit through which the mixing bag passes; tray holders coupled to each end of the fixed tray member and the movable tray member, the tray holders fixedly supporting the fixed tray member, and having a plurality of guide grooves accommodating the combining projections to rotatably support the movable tray member; and anchoring prominences on the guide grooves adjacent to the fixed tray member, preventing the combining projections from breaking away from the guide grooves when the movable tray member rotates.

The bread maker further includes guide members located at opposite side walls in the baking space, wherein the tray holders are slidably coupled to the guide members.

Each anchoring prominence is located on an upper opening of a corresponding one of the guide grooves.

To achieve the above and other objects according to another aspect of the present invention, there is provided a baking tray assembly for a bread maker, including tray holders having a plurality of guide grooves on a first end of each tray holder; a fixed tray having an open side and being fixedly attached to a second end of each tray holder; a movable tray having another open side and a plurality of projections on opposite side walls thereof, the guide grooves of the tray holders rotatably accommodating the projections of the movable tray, with the movable tray adjacent to the fixed tray and the open sides of the movable tray and the fixed tray facing one another to form a container; and anchors projecting into upper openings of the guide grooves adjacent to the fixed tray to prevent the projections from exiting the guide grooves when the movable tray rotates.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompanying drawings, of which.

DETAILED DESCRIPTION OF THE PREFERRED EMBODIMENT

Figure 1:
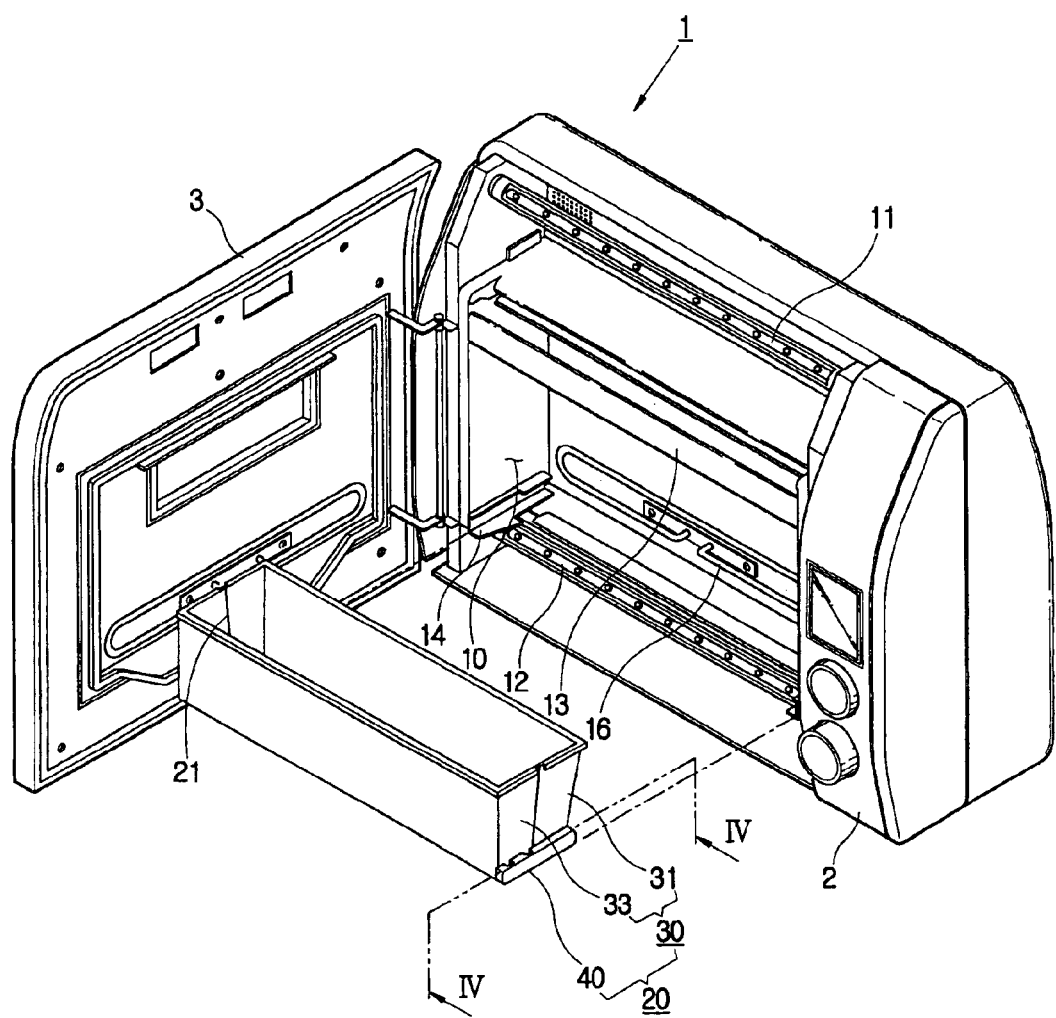
FIG. 1 is a perspective view of a bread maker according to an embodiment of the present invention.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 2:
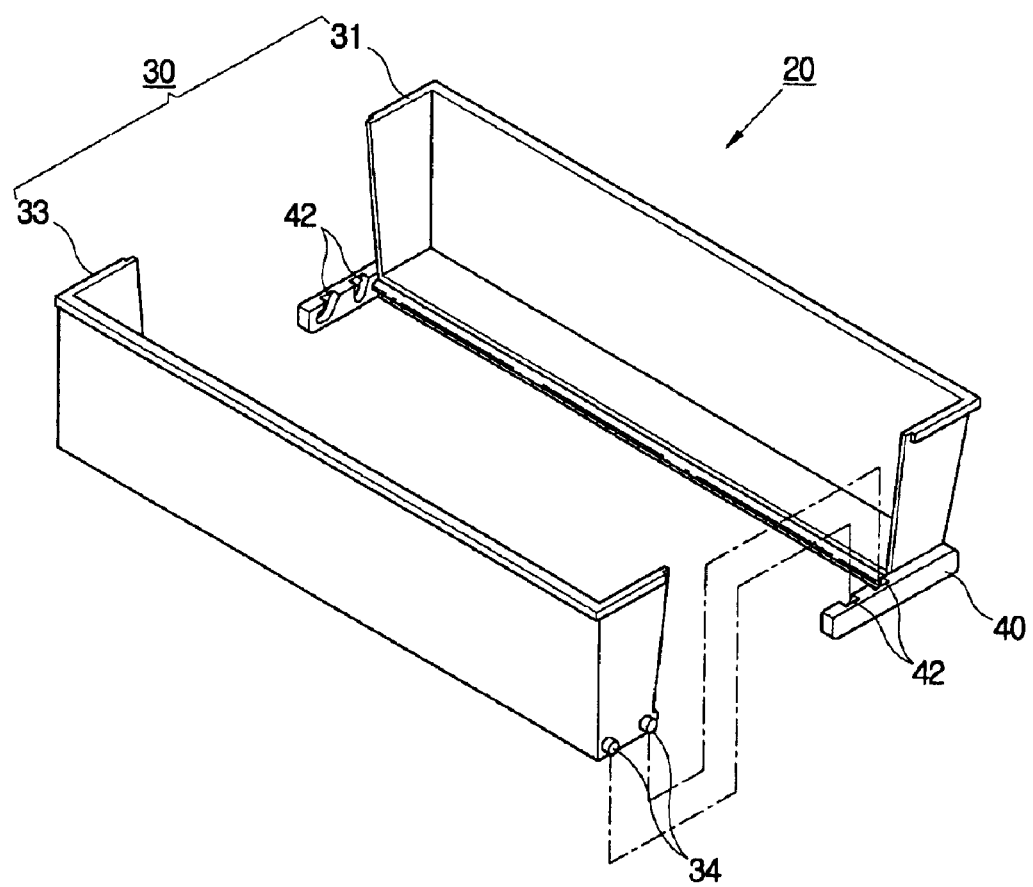
FIG. 2 is an exploded perspective view of a baking tray shown in FIG. 1.

Referring to FIGS. 1 and 2, a bread maker according to an embodiment of the present invention includes a main body 1 having a baking space 10, a door 3 to open and close an opening formed at the front of the main body 1, and a panel 2 to manipulate the bread maker, which is provided at one side of the front of the main body 1.

At an upper part and a lower part of the baking space 10 are an upper kneading drum 11 and a lower kneading drum 12 for respectively winding an upper end and a lower end of a mixing bag 5 (FIG. 4A) containing ingredients for dough. The upper kneading drum 11 and the lower kneading drum 12 are parallel to one another and rotate reciprocally. Between the upper kneading drum 11 and the lower kneading drum 12 are a pair of kneading supporting members 13 that prevent kneading ingredients in the mixing bag from moving out toward the upper kneading drum 11.

Also, between the kneading supporting member 13 and the lower kneading drum 12 is a baking tray assembly 20 accommodating the kneaded ingredients, which may be withdrawn from the baking space 10 and removed from the bread maker.

The baking tray assembly 20 has a baking tray 30 including a fixed tray member 31 and a movable tray member 33, and a pair of tray holders 40 respectively coupled to end parts of the fixed tray member 31 and the movable tray member 33.

Figure 4A:
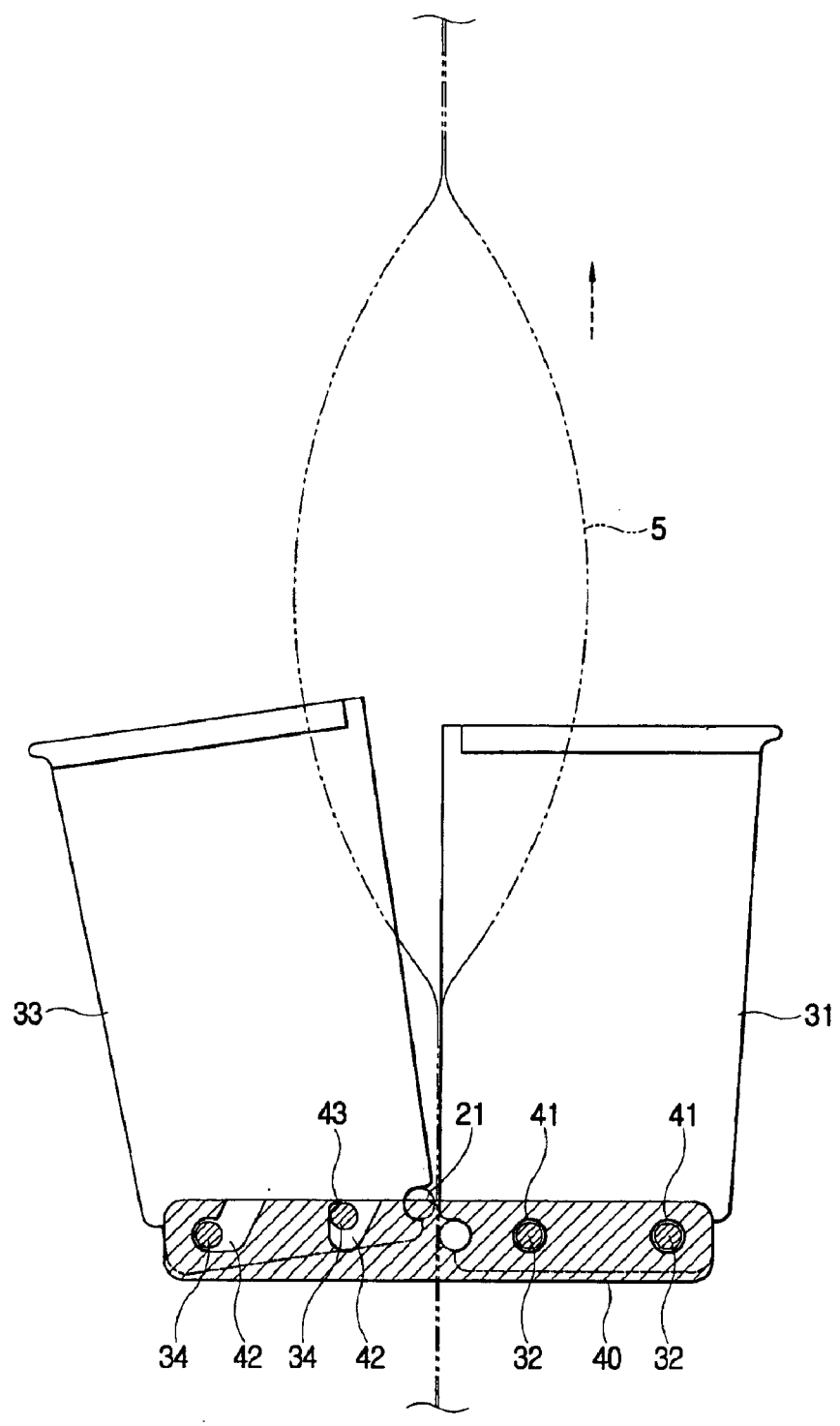
FIGS. 4A and 4B are sectional views of the baking tray of FIG. 1 taken along line IV—IV.

On a lower end of each side wall of the fixed tray member 31 are fixing projections 32 that protrude from the surface thereof and engage the tray holders 40 (refer to FIG. 4A). On a lower end of each side wall of the movable tray member 33 are combining projections 34 that protrude from the surface thereof and are movably coupled to the tray holders 40.

The tray holders 40 are slidably coupled to guide members 14, which are provided at both side walls in the baking space 10 and are opposite one another.

On an area of the tray holders 40 adjacent to the fixed tray member 31 are fixed projection accommodating grooves 41 for accommodating the fixing projections 32 of the fixed tray member 31 (FIG. 4A). On an area of the tray holders 40 adjacent to the movable tray member 33 are guide grooves 42 that cave downwardly from the surface thereof for movably accommodating the combining projections 34 of the movable tray member 33.

Figure 3:
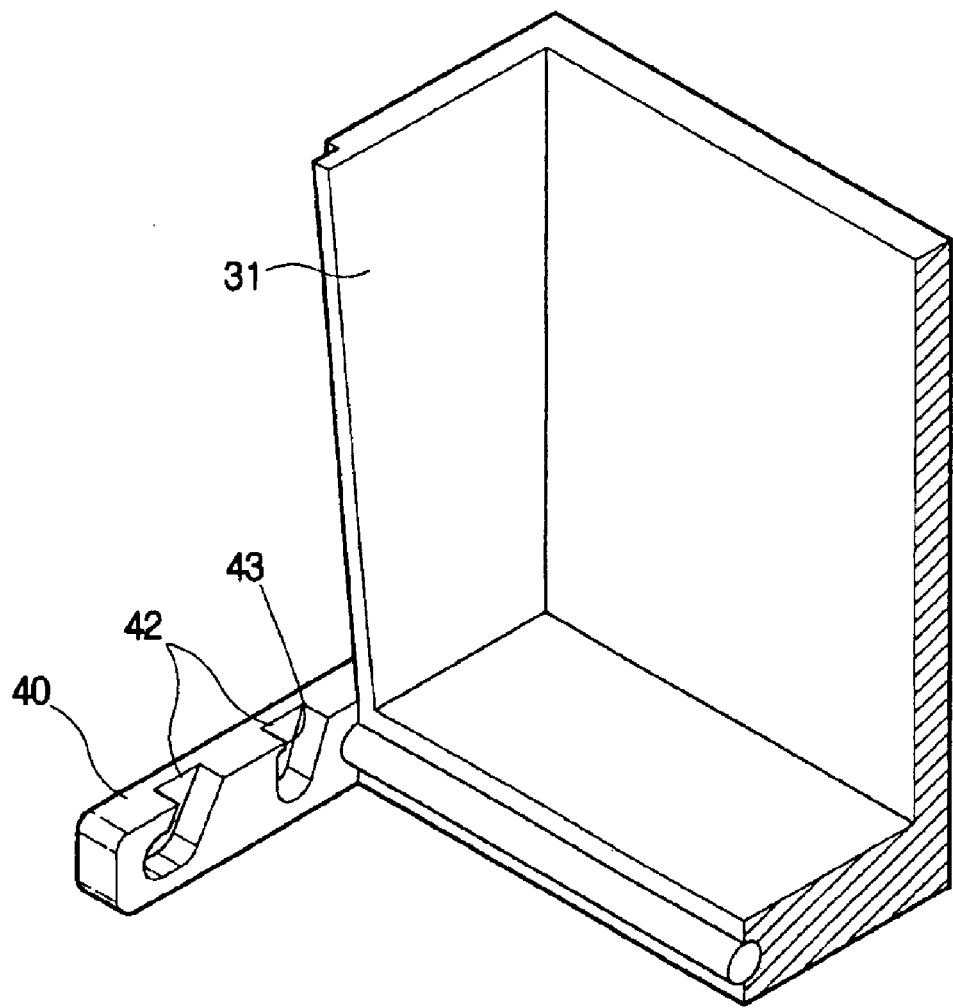
FIG. 3 is an enlarged view of the baking tray of FIG. 2.

As shown in FIG. 3, on an upper opening area of each guide groove 42 adjacent to the fixed tray member 31 is an anchoring prominence 43 for preventing the combining projections 34 that are accommodated in the guide groves 42 from breaking away from the tray holders 40.

Accordingly, the fixing projections 32 of the fixed tray member 31 are coupled to the fixed projection accommodating grooves 41, thereby mounting the fixed tray member 31 on the tray holders 40. Also, the combining projections 34 of the movable tray member 33 are movably inserted into the guide grooves 42 of the tray holders 40, thereby movably mounting the movable tray member 33 on the tray holders 40.

As described above, the fixed tray member 31 and the movable tray member 33 face one another by use of the tray holders 40, thereby forming the baking tray 30 having a rectangular container opening upwardly. Thus, on the baking tray 30 is formed a slit 21 along the contact area of the fixed tray member 31 and the movable tray member 33.

The upper end of the mixing bag 5 (FIG. 4A) is wound on the upper kneading drum 11. The lower end of the mixing bag 5 is wound on the lower kneading drum 12 through the pair of kneading support members 13 and through the slit 21 formed on the bottom of the baking tray 30. Further, during kneading, the mixing bag 5 containing the ingredients for the dough reciprocates upwardly and downwardly according to rotation of the upper kneading drum 11 and the lower kneading drum 12. Thus, the ingredients for the dough contained in the mixing bag 5 are kneaded between the kneading support members 13 and the baking tray 30.

After the kneading process is completed, the mixing bag 5 is detached from the upper kneading drum 11 while the lower kneading drum 12 rotates. The mixing bag 5 passes through the kneading support members 13, and then passes through the slit 21. Further, when the mixing bag 5 passes through the slit 21 of the baking tray 30, the kneaded dough contained in the mixing bag 5 does not pass through the slit 21 of the baking tray 30 and, thus, is removed from the mixing bag 5 and accommodated in the baking tray 30. As the mixing bag 5 passes through the slit 21, the mixing bag 5 is wound on the lower kneading drum 12. Thus, the dough accommodated in the baking tray 30 is made into bread by using a heater 16 in the baking space 10.

Figure 4B:
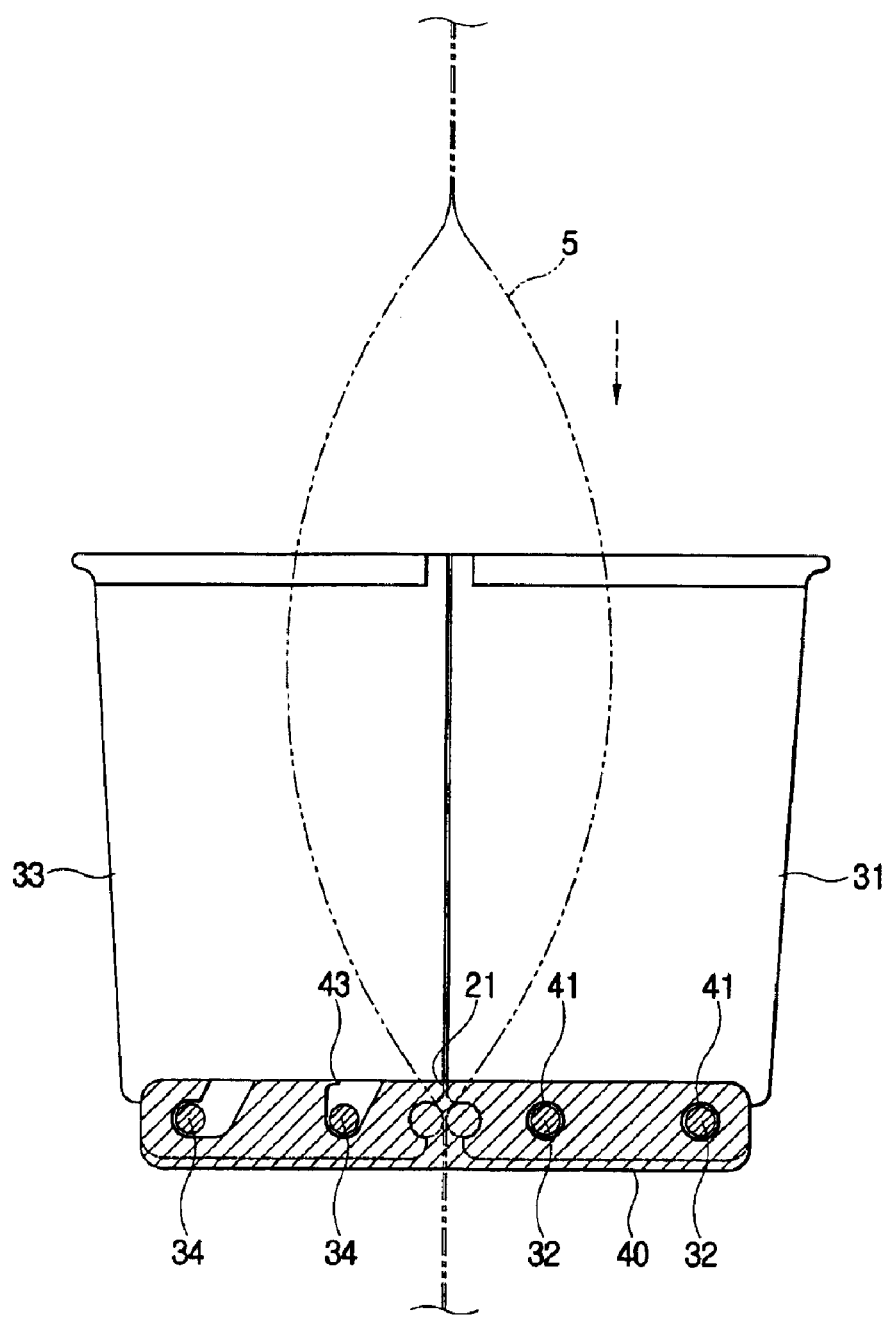
Figure 5:
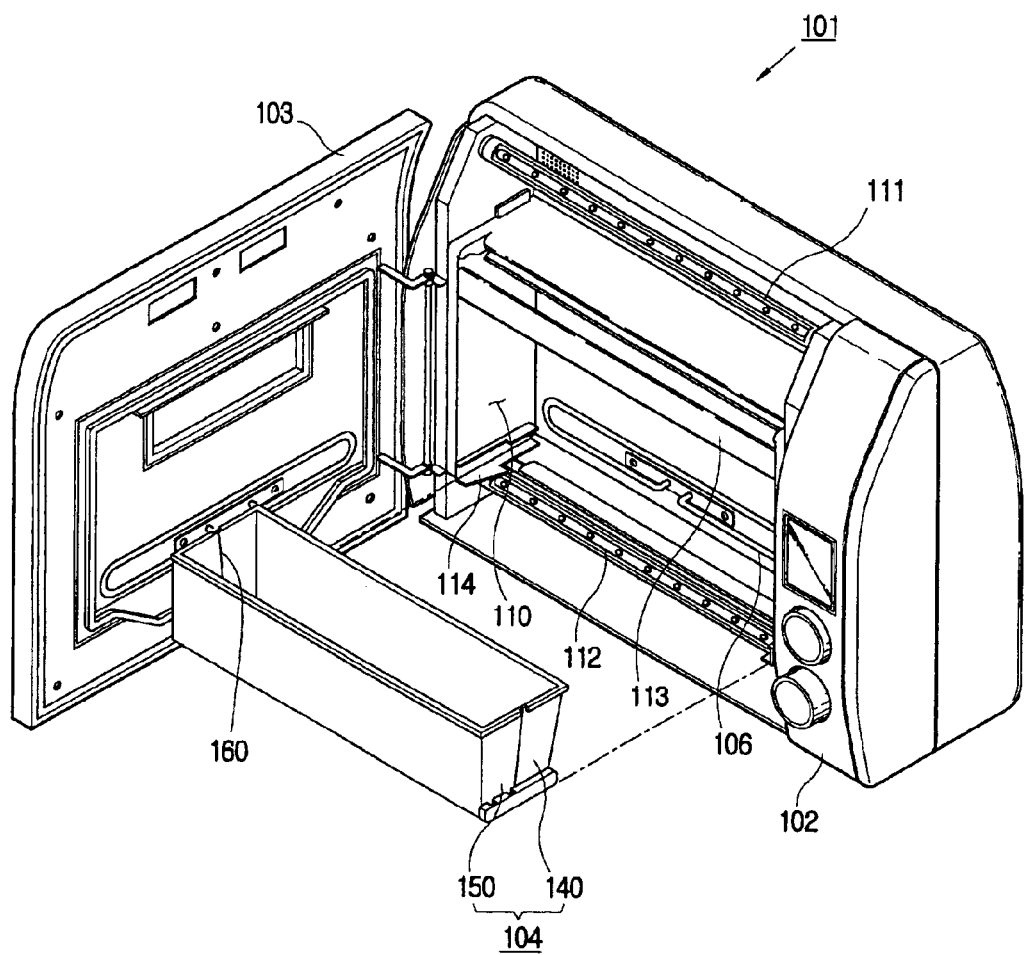
FIG. 5 is a perspective view of a conventional bread maker.
Figure 6:
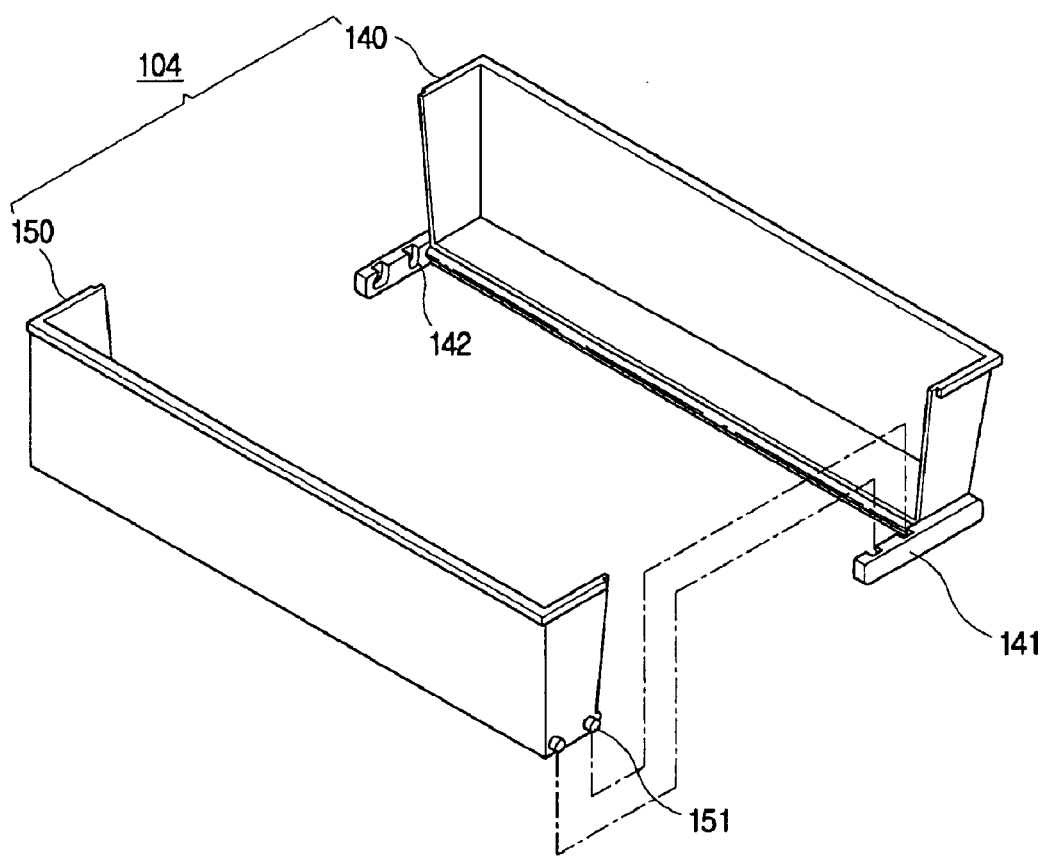
FIG. 6 is an exploded perspective view of a baking tray shown in FIG. 5.

Referring to FIGS. 4A and 4B, when the mixing bag 5 containing the ingredients for the dough reciprocates upwardly and downwardly through the slit 21 and is kneaded between the kneading support members 13 and the baking tray 30 during the kneading process, the movable tray member 33 rotates clockwise and counterclockwise as the mixing bag 5 moves upwardly and downwardly through the slit 21 because the movable tray member 33 is movably coupled to the tray holders 40.

For example, referring to the embodiment shown in FIG. 4A, when the mixing bag 5, which has a lower end that passes through the slit 21, moves upwardly, the movable tray member 33 rotates counterclockwise away from the fixed tray member 31 by pivoting around the leftmost combining projections 34. Thus, the combining projections 34 of the movable tray member 33 accommodated in the guide grooves 42 adjacent the slit 21 also rotate and are stopped by the anchoring prominences 43. Consequently, the movable tray member 33 rotates until the combining projections 34 engage the anchoring prominences 43 of the guide grooves 42.

On the other hand, referring to the embodiment shown in FIG. 4B, when the mixing bag 5 moves downwardly through the slit 21, the movable tray member 33 rotates clockwise around the leftmost combining projections 34 towards the fixed tray member 31, thereby allowing the combining projections 34 engaging the anchoring prominences 43 of the guide grooves 42 to move into the guide grooves 42 again.

According to the embodiment of the present invention described above, the movable tray member 33 rotates away from the fixed tray member 31 as the mixing bag 5 moves upwardly, and the combining projections 34 accommodated in the guide grooves 42 that adjoin the fixed tray member 31 are prevented from breaking away by the anchoring prominences 43 of the guide grooves 42, thereby preventing the movable tray member 33 from rotating at an excessive angle relative to the tray holders 40.

Then, while the movable tray member 33 returns to its initial position in which the movable tray member 33 and the fixed tray member 31 face one another to form the baking tray 30, the impact of the movable tray member 33 on the fixed tray member 31 at the moment the movable tray member 33 contacts the fixed tray member 31 is minimized, thereby reducing the noise generated by the impact.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker, comprising:
   a main body having a baking space;
   kneading drums located at an upper part and a lower part in the baking space, the kneading drums holding opposite ends of a mixing bag;
   a movable tray member having a plurality of combining projections at opposite side walls thereof;
   a fixed tray member positioned opposite the movable tray member to form a slit through which the mixing bag passes;
   tray holders coupled to each end of the fixed tray member and the movable tray member, respectively, the tray holders fixedly supporting the fixed tray member, and having a plurality of guide grooves accommodating the combining projections to rotatably support the movable tray member; and
   anchoring prominences on the guide grooves adjacent to the fixed tray member, preventing the combining projections from breaking away from the guide grooves when the movable tray member rotates.

2. The bread maker according to claim 1, further comprising guide members located at opposite side walls in the baking space, wherein the tray holders are slidably coupled to the guide members.

3. The bread maker according to claim 1, wherein each anchoring prominence is located on an upper opening of the guide grooves.

4. The bread maker according to claim 2, wherein each anchoring prominence is located on an upper opening of the guide grooves.

5. The bread maker according to claim 1, further comprising a control panel in a front side of the main body to allow a user to control the bread maker.

6. The bread maker according to claim 1, further comprising a heater in the baking space to bake the bread.

7. The bread maker according to claim 1, wherein the fixed tray member, the movable tray member, the tray holders, and the anchoring prominences form a baking tray assembly located between the kneading drums, the baking tray assembly holding kneaded dough for baking and being removable from the baking space.

8. The bread maker according to claim 1, further comprising a plurality of fixing projections at opposite side walls of the fixed tray member and a plurality of fixed projection accommodating grooves on an end of each tray holder adjacent to the fixed tray member, the fixed projection accommodating grooves receiving the fixing projections to mount the fixed tray member to the tray holders.

9. The bread maker according to claim 1, wherein the guide grooves cave downwardly from a surface thereof to movably accommodate the combining projections of the movable tray member.

10. The bread maker according to claim 1, wherein the movable tray member faces the fixed tray member to form a rectangular baking tray container for holding and baking the bread.

11. The bread maker according to claim 1, wherein the slit is formed along a contact area between the fixed tray member and the movable tray member.

12. The bread maker according to claim 1, wherein the kneading drums are parallel to one another and include an upper kneading drum and a lower kneading drum, the upper kneading drum receiving and winding an upper end of the mixing bag and the lower kneading drum receiving and winding a lower end of the mixing bag, the upper kneading drum and the lower kneading drum rotating reciprocally to respectively wind the upper end and the lower end of the mixing bag.

13. The bread maker according to claim 12, further comprising kneading support members between the upper kneading drum and the lower kneading drum to prevent kneading ingredients in the mixing bag from moving out and toward the upper kneading drum.

14. The bread maker according to claim 13, wherein the lower end of the mixing bag is wound on the lower kneading drum through the kneading support members and the slit, and ingredients for dough contained in the mixing bag are kneaded between the kneading support members and the fixed tray member and the movable tray member.

15. The bread maker according to claim 14, wherein after the ingredients in the mixing bag have been kneaded, the mixing bag is detached from the upper kneading drum while the lower kneading drum continues rotating and winding the mixing bag, with the mixing bag passing through the slit to empty the kneaded ingredients from the mixing bag into a container formed by the fixed tray member and the movable tray member.

16. The bread maker according to claim 13, wherein when the mixing bag reciprocates upwardly and downwardly through the slit while the ingredients are kneaded, the movable tray member rotates away from and towards the fixed tray member as the mixing bag moves upwardly and downwardly, respectively, the rotation of the movable tray member away from the fixed tray member being stopped when the combining projections contact the anchoring prominences of the tray holders to limit an angle of rotation of the movable tray member, and the movable tray member rotating towards the fixed tray member to return to an initial position as the mixing bag reciprocates downwardly through the slit, the limited angle of rotation reducing noise generated when the movable tray member contacts the fixed tray member.

17. A baking tray assembly for a bread maker, comprising:

tray holders having a plurality of guide grooves on a first end of each tray holder;

a fixed tray having an open side and being fixedly attached to a second end of each tray holder;

a movable tray having another open side and a plurality of projections on opposite side walls thereof, the guide grooves of the tray holders rotatably accommodating the projections of the movable tray, with the movable tray adjacent to the fixed tray and the open sides of the movable tray and the fixed tray facing one another to form a container; and anchors projecting into upper openings of the guide grooves adjacent to the fixed tray to prevent the projections from exiting the guide grooves as the movable tray rotates.

18. The baking tray assembly according to claim 17, further comprising a plurality of fixing projections at opposite side walls of the fixed tray and a plurality of fixed grooves on an end of each tray holder adjacent to the fixed tray, the fixed grooves receiving the fixing projections to mount the fixed tray to the tray holders.

19. The baking tray assembly according to claim 17, wherein the guide grooves cave downwardly from a surface thereof to movably accommodate the projections of the movable tray member.

20. The baking tray assembly according to claim 17, wherein a slit is formed along a contact area between the fixed tray and the movable tray.

21. The baking tray assembly according to claim 20, wherein a mixing bag containing ingredients for the bread reciprocates upwardly and downwardly through the slit while the ingredients are kneaded, with the movable tray member rotating away from and towards the fixed tray member as the mixing bag moves upwardly and downwardly, respectively, the rotation of the movable tray away from the fixed tray member being stopped when the projections contact the anchors of the tray holders to limit an angle of rotation of the movable tray, and the movable tray rotating towards the fixed tray member to return to an initial position as the mixing bag reciprocates downwardly through the slit, the limited angle of rotation reducing noise generated when the movable tray member contacts the fixed tray member.

22. A baking tray assembly for a bread maker, comprising:

means for fixedly attaching each end of a fixed tray to a first side of tray holders;

means for rotatably attaching each end of a movable tray to a second side of the tray holders; and means for limiting a rotation angle of the movable tray as the movable tray rotates to reduce noise generated as the movable tray returns to an initial position and contacts the fixed tray.

* * * * *